(12) United States Patent
Delmar

(10) Patent No.: US 6,779,906 B1
(45) Date of Patent: Aug. 24, 2004

(54) DECORATIVE TREE LIGHTNING SYSTEM

(76) Inventor: Stephen Delmar, 217 N. Ironwood, Gilbert, AZ (US) 85234

( * ) Notice: Subject to any disclaimer, the term of this patent is extended or adjusted under 35 U.S.C. 154(b) by 0 days.

(21) Appl. No.: 10/392,259

(22) Filed: Mar. 19, 2003

(51) Int. Cl.$^7$ ................................................. F21S 4/00
(52) U.S. Cl. ........................ 362/122; 362/554; 362/564; 362/374; 362/806
(58) Field of Search ............................... 362/122, 123, 362/551, 554, 564–568, 374, 375, 805, 806; 385/100, 109, 147, 900; 174/36, 135, 136

(56) References Cited

U.S. PATENT DOCUMENTS

| | | | |
|---|---|---|---|
| 3,564,233 A | * 2/1971 | Cox et al. ...................... 40/444 |
| 3,766,376 A | 10/1973 | Sadacca |
| 4,068,118 A | 1/1978 | Carrington |
| 4,201,197 A | * 5/1980 | Dismer ........................ 126/600 |
| 4,765,701 A | * 8/1988 | Cheslak ........................ 362/560 |
| 4,777,571 A | 10/1988 | Morgan |
| 4,858,086 A | 8/1989 | Pietrantonio |
| 4,878,157 A | 10/1989 | Koch |
| 5,104,608 A | 4/1992 | Bickering |
| 5,422,797 A | 6/1995 | Shattan |
| 5,517,390 A | 5/1996 | Zins |
| 5,702,170 A | 12/1997 | Broderick |
| 5,776,559 A | 7/1998 | Woolford |
| 5,820,248 A | 10/1998 | Ferguson |
| 5,829,863 A | 11/1998 | Gutshall |
| 5,944,416 A | 8/1999 | Marsh |
| 6,017,142 A | 1/2000 | Harris |
| 6,056,427 A | 5/2000 | Kao |
| 6,143,381 A | * 11/2000 | Hawkins ...................... 362/806 |
| 6,361,198 B1 | 3/2002 | Reed |
| 6,386,728 B1 | 5/2002 | Colonna |
| 6,523,584 B1 | * 2/2003 | Rehrig ........................ 150/154 |

FOREIGN PATENT DOCUMENTS

DE           4205295     * 8/1993        F21V/23/00

* cited by examiner

*Primary Examiner*—Alan Cariaso
*Assistant Examiner*—Mark Tsidulko
(74) *Attorney, Agent, or Firm*—LaValle D. Ptak

(57) ABSTRACT

A Christmas tree lighting system for utilization with natural or artificial Christmas trees includes an outer elongated tubular covering having a zippered opening extending the length thereof. This outer cover may be either attached to the trunk of the tree, or suspended from an upper branch to extend along the trunk of the tree. The outer covering has attached to its interior one or more elongated flexible tubular casings, with a longitudinal zippered opening extending from the upper end thereof downwardly a predetermined distance toward the lower end thereof. The tubular casings in turn enclose a plurality of flexible optical fibers extending from the bottom thereof substantially toward the top of the casing. When the zippered casing is opened, the optical fibers may be bent outwardly therefrom and spread apart to lie along branches of a tree in which the lighting system is used. A source of light is applied to the bottom end of the optical fibers at the base of the tree. The lighting system may be removed from the tree by pulling the entire assembly downwardly out of the tree and then first closing the tubular casings around the flexible optical fibers, and then closing the outer covering. The entire assembly then may be rolled up and stored until its next use is desired.

20 Claims, 7 Drawing Sheets

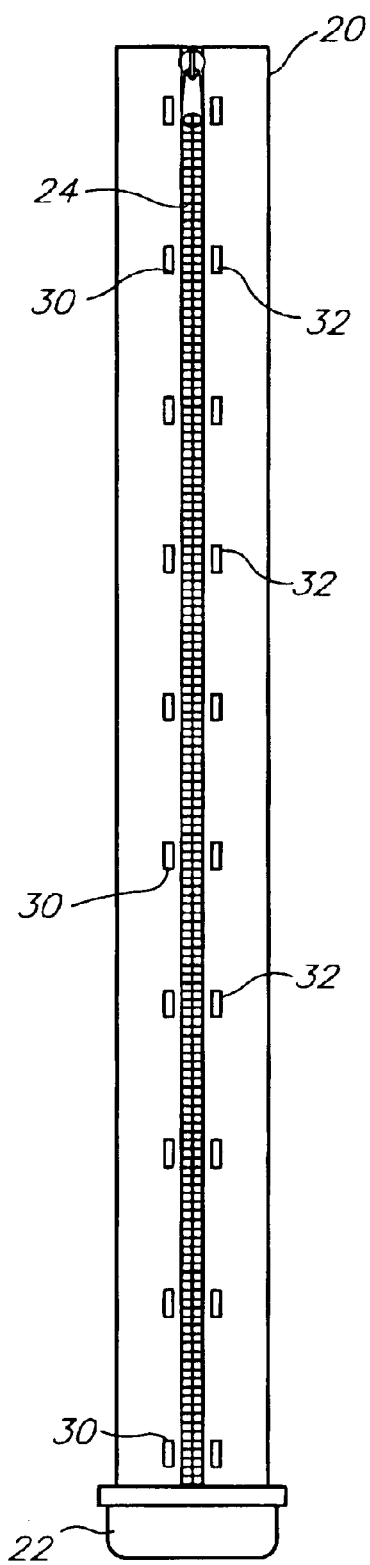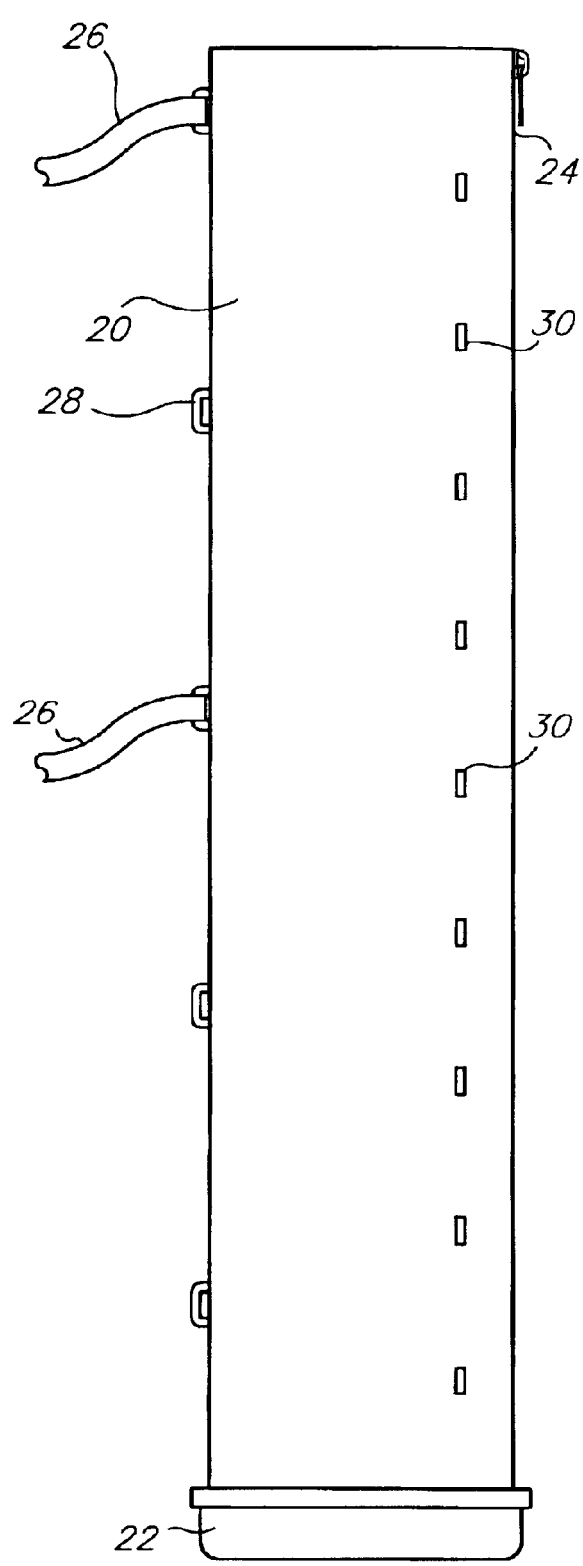
Fig. 1
Fig. 2

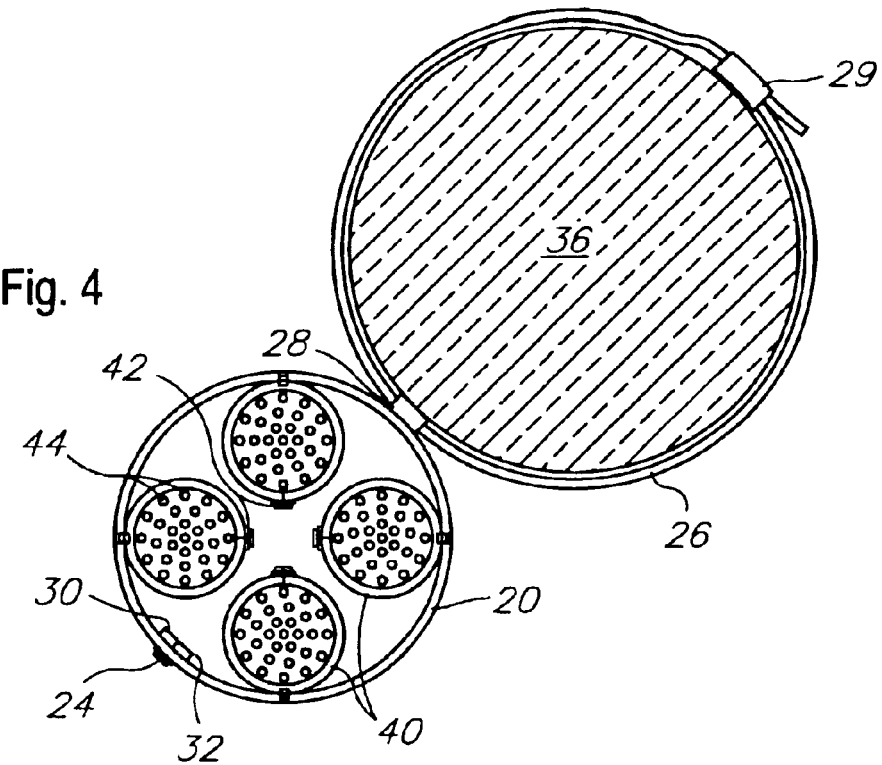
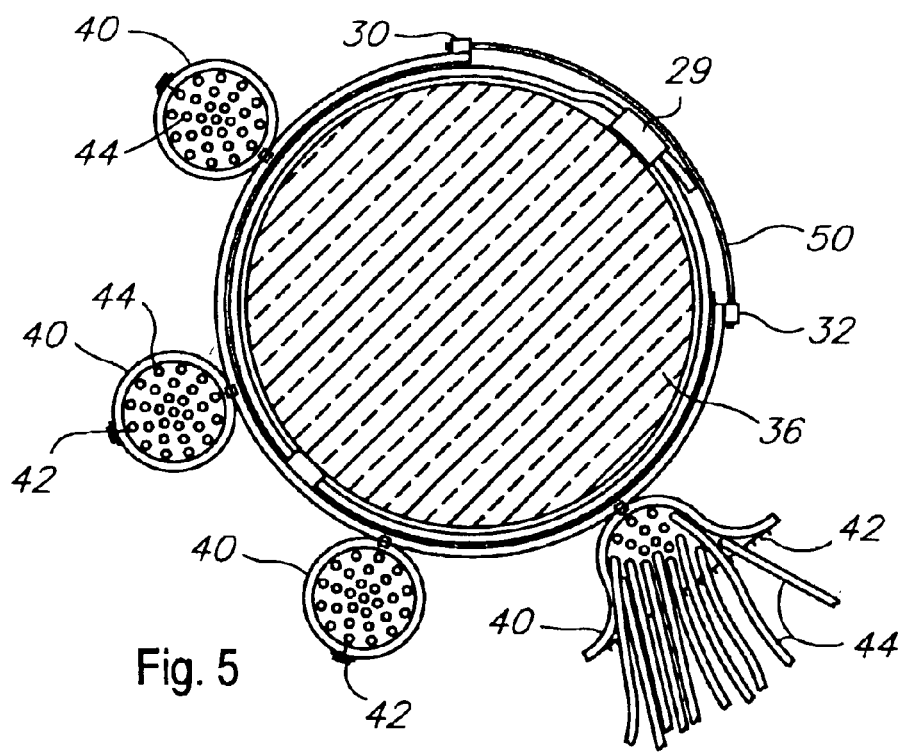

DECORATIVE TREE LIGHTNING SYSTEM

BACKGROUND

The present invention is directed to decorative light sets, and more particularly, to decorative light sets useful in the decoration of Christmas trees and the like. Traditional decorative lights for Christmas trees, both for indoor and outdoor use, typically consist of a pair of electrical wires carrying a plurality of series or parallel connected lights, which may be strung through the branches of indoor or outdoor Christmas trees. Typically, these light sets are designed to be connected in series with one another, or multiple light sets may be used on a single tree. This requires the use of multiple extension cords and connections to an electric light source. The stringing of such a light set through a tree is a somewhat time consuming and tedious procedure, both in the initial installation and in the subsequent removal of the light set when the tree is to be taken down, or the decorations are to be removed.

The United States patent to Woolford U.S. Pat. No. 5,776,559 is directed to an electric Christmas tree, the trunk of which is in the form of an elongated hollow post having electrical connectors extending through it and terminating at a plurality of points along its length in electrical sockets. This allows different strings of lights to be plugged into the "trunk" of the tree, from which artificial branches are extended. The design of this patent eliminates the necessity for stringing extension cords and multiple connectors between the tree and nearby wall outlets. Only a single wall outlet is required with the structure of this tree The structure of Woolford, however, still requires individual stringing of the lights on the branches of the artificial Christmas tree of which it is a part.

The advent of fiber optic strands has resulted in a large number of ideas for utilizing a single light source typically located at the base of a tree to illuminate one end of a bundle of optic fibers, the other ends of which are distributed in various manners to the branches of artificial Christmas trees. A large number of patents are directed the formation of an artificial Christmas tree with a hollow trunk, through which optical fibers extend to a termination point near or at the base of the trunk. A light source is provided for illuminating this end of the optical fibers. Then, at various points along the trunk, holes are provided for the passage of optical fibers out of the trunk onto the branches of the tree. The manner in which the fibers are connected or displayed on the branches varies in the disclosures of the different patents directed to this general type of construction; but the overall structure is substantially the same. All of the patents which utilize this type of structure are directed to artificial Christmas trees in which the fiber optic light systems are permanently attached. Patents representative of such construction are the U.S. patents to Pickering U.S. Pat. No. 5,104,608; Shattan U.S. Pat. No. 5,422,797; Broderick U.S. Pat. No. 5,702,170; Ferguson U.S. Pat. No. 5,820,248; Gutshall U.S. Pat. No. 5,829,863; Harris U.S. Pat. No. 6,017,142; and Kao U.S. Pat. No. 6,056,427.

A different technique for permanently installed fiber optic lighting systems in artificial Christmas trees is described in the United States patents to Carrington U.S. Pat. No. 4,068, 118; Pietrantonio U.S. Pat. No. 4,858,056; Cook U.S. Pat. No. 4,878,157; and Zins U.S. Pat. No. 5,517,390. Although the specific structure employed in each of these patents is somewhat different, all of them employ the utilization of a hollow trunk or central core of some type which includes a light source extending in it in the form of an elongated fluorescent tube, or in the form of individual multiple lights. Then fiber optic strands or bundles are connected to the tree branches and extend to receive light from this internal central core. The primary difference between the patents of this group and those mentioned previously is that the optic fibers do not extend into the hollow trunk and downwardly to a common source at the bottom of the tree, but rather extend from the branches to different positions along the length of the trunk, which includes the internal lighted core.

Patents utilizing fiber optic strands for providing illumination in a Christmas tree which are not directed to permanently built-in type systems also have been devised for replacing the standard two-wire multiple light systems which have been in common use. One such patent is the United States patent to Morgan U.S. Pat. No. 4,777,571. This patent is directed to a fiber optic bundle which is connected at one end to a light source designed to be located near the bottom of a tree. Multiple strands then extend in parallel from this source, and are designed to be attached to the tree at various points throughout the tree. This results in a spray-like dispersal of the different optical fibers which comprise the lighting system. It is necessary to individually place each of the fiber ends where desired in the tree, and then remove these fiber ends from the tree when the lighting system is to be removed, much in the same manner as effected with the common multiple light strings which have been in widespread use in the past.

The United States patent to Reed U.S. Pat. No. 6,361,198 is directed to a system for lighting the branches of a Christmas tree by means of a fiber optic bundle which extends from the base of the tree. The fiber optic strands are strung through the branches, or are permanently secured in the branches in an artificial tree.

The United States patent to Colonna U.S. Pat. No. 6,386, 728 is directed to a different structure, in which a light source is provided in a ring which is placed over the top of a Christmas tree, either artificial or natural. Fiber optic strands then hang down from the ring and may be arranged along the branches of the tree or strung through the tree from the top to the bottom in order to provide the desired light source.

It is desirable to provide a fiber optic light source which may be used with both natural and artificial Christmas trees, which is not a permanent part of the tree, and which is easy to install and easy to remove from the tree for storage from one season to the next.

SUMMARY OF THE INVENTION

It is an object of this invention to provide an improved decorative light system.

It is another object of this invention to provide an improved decorative light system using fiber optic strands.

It is an additional object of this invention to provide an improved decorative fiber optic Christmas tree lighting system capable of use with both artificial and natural trees.

It is a further object of this invention to provide an improved removable, easily storable and simple to install fiber optic lighting system for use with Christmas trees and the like.

In accordance with a preferred embodiment of the invention, a removable lighting system for a tree includes a first elongated, generally flexible casing with first and second ends, and having a longitudinal reclosable opening in it extending from the second end a predetermined distance toward the first end. A plurality of flexible optical fibers are located in the casing, and extend from the first end toward the second end of the casing. The fibers are released for arrangement on the branches of a tree upon opening of the reclosable opening in the casing, either partially or through its entire length to allow the fibers extending from the first end of the casing to be arranged outwardly from the opening onto the branches of the tree.

BRIEF DESCRIPTION OF THE DRAWINGS

FIG. 1 is a front view of a preferred embodiment of the invention;

FIG. 2 is a side view of the embodiment shown in FIG. 1;

FIG. 4 is a cross-sectional view taken along the line 4—4 of FIG. 3;

FIG. 5 is a cross-sectional view of the embodiment shown in FIG. 4 illustrating further features;

DETAILED DESCRIPTION

Figure 3:
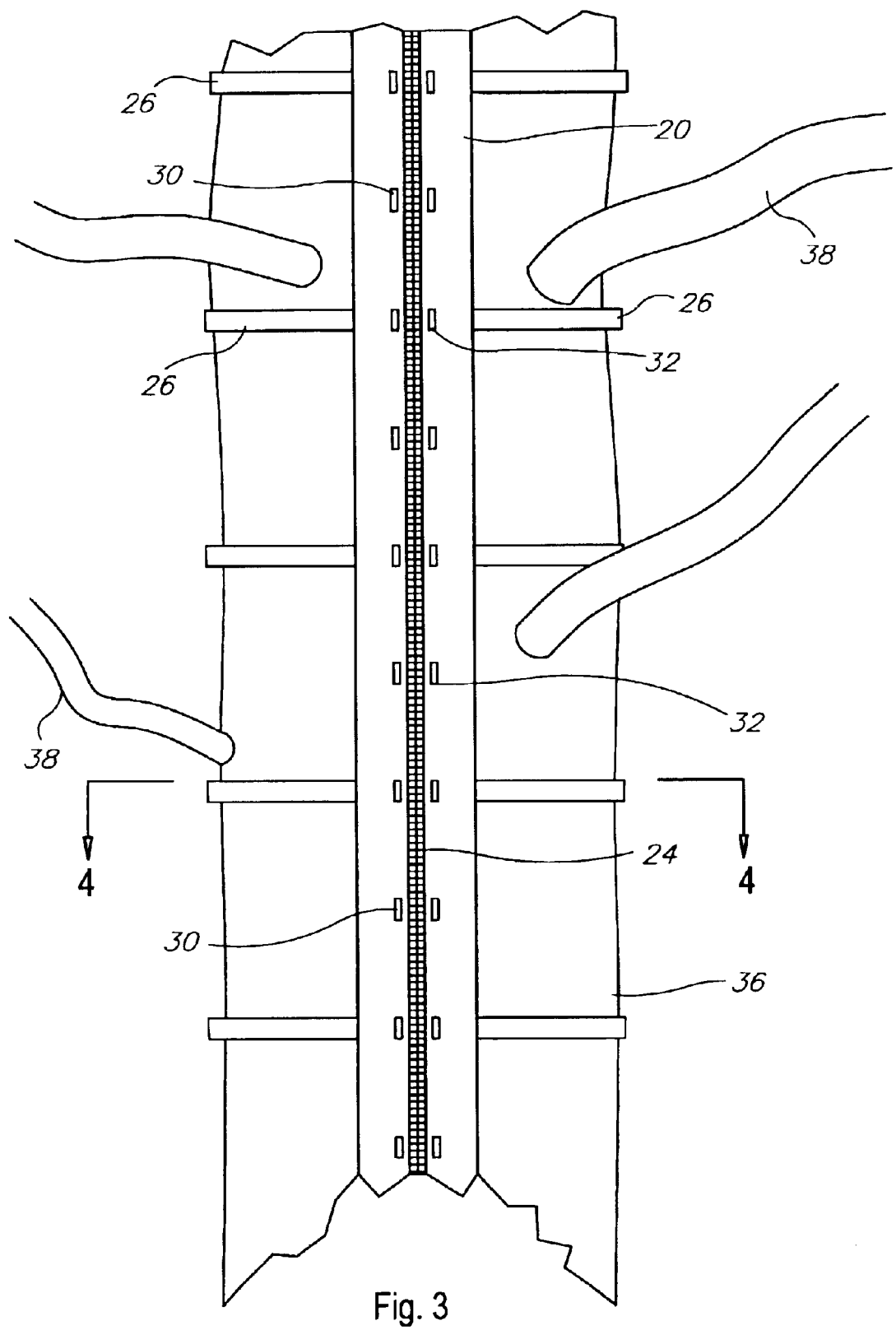
FIG. 3 is a front view of the embodiment shown in FIG. 1 illustrating its manner of use.

Reference now should be made to the drawings in which the same reference numbers are used throughout the different figures to designate the same or similar components. Before entering into a specific discussion of the structure which is shown in the various figures of the drawings, it should be noted that the preferred embodiments of the invention include an outer cover or sleeve made of flexible material, such as cloth or plastic. This outer cover then carries several (typically, three or four) smaller diameter inner casings of elongated optical fibers inside the outer cover. In its storage position, the outer cover and the included inner casings can be rolled up into a relatively compact package for storing. Typically, the outer cover, containing the inner casings of fibers, has a diameter on the order of between 1" and 2".

When the lighting system is to be placed into and attached to either an artificial or a natural Christmas tree or the like, it is unwound and extended to its full length, as shown in the front view of Figure and the side view of FIG. 2. As illustrated, the outer cover 20 has a reclosable opening, shown as a zipper opening 24 extending from its upper end to a point at or near the bottom. At the bottom of the assembly, a built-in light source 22 or a termination point for the exposed bottom ends of a plurality of fiber optic strands carried within the cover 20 is provided.

Ideally, the bottom 22 is connected permanently to the bottom of the cover or sleeve 20, and it includes a suitable light source for illuminating the ends of a large number of fiber optic strands in a conventional manner. The source of light may be of a monochromatic type; or there may be a rotating color wheel which provides light input of different colors as the wheel is rotated to produce different aesthetic treatments. The manner in which the fiber optic strands are illuminated, however, may be of any conventional type; and for that reason, no details of this portion of the system are shown.

The outer cover 20 also has connection rings 28 spaced at intervals along its length on the side opposite the reclosable opening 24, as illustrated in FIG. 2. These rings 28 typically are spaced apart approximately 12" or so, and accommodate flexible straps or twist tie fasteners 26, which are looped through the rings 28 and then are wound around the trunk 36 of either a natural or artificial tree or the like, as illustrated in FIGS. 3,4 and 5. These rings 28 are used when the outer cover 20 is extended from a point near the base of the tree and threaded upwardly between the branches, as illustrated in FIG. 3, to a point near the top of the tree.

The straps 26 or other suitable connection devices then are drawn around the trunk of the tree 36, as illustrated in FIGS. 3 and 4, and are used to secure the outer cover 20, containing three or more inner casings of bundles of fibers, such as the four casings 40 shown in FIGS. 4 and 5, from the bottom of the tree to the top. Although FIG. 3 shows the outer cover 20 extending in a straight line parallel to the axis of the trunk 36 of the tree, it should be understood that the flexible outer cover 20, with the casings 40 inside it may be passed through the branches 38 extending outwardly from the trunk 36 of the tree in a serpentine manner, attaching the cover 20 at spaced intervals by the straps 26 along the length of the tree to secure it in place.

Once the outer cover 20 has been secured as shown in FIG. 3, the reclosable or zippered opening 24 is opened from top to bottom to allow the outer cover 20 to be spread open to spread out over one-fourth to one-half of the circumference of the trunk 36. This exposes and spaces the inner fiber optic casings 40, moving them from the position shown in the cross-sectional view of FIG. 4 to the position shown in the cross-sectional view of FIG. 5.

In order to hold the outer cover 20 open in the position diagrammatically illustrated in FIG. 5, spreaders 50 in the form of elastic cords, twist ties, fasteners or the like, are extended through sets of spreader openings 30 and 32 located on opposite sides of the reclosable fastener 24, as illustrated in FIGS. 1,2,3,4 and 5. FIG. 5 shows a spreader 50 in position, pulling the two edges of the cover 20 around the trunk 36 of the tree, to position the internal fiber optic casings 40 at spaced intervals, generally as illustrated in FIG. 5. It should be noted that the casings 40 each are attached permanently on their rear sides to the interior of the cover 20 and extend parallel to the axis of the cover 20 when it is in its closed position.

Each of the interior casings 40 consist of an outer flexible cover of plastic or cloth, which may be of the same or similar material to the material used for the outer cover 20. Each of these inner casings 40 also includes an elongated reclosable opening illustrated in the form of zippered openings 42 in FIGS. 4 to 8 to allow these inner casings 40 to be opened from the top end to a distance extending from the top toward the bottom, in varying amounts for each of the different casings 40. Each of the casings 40 carries and encloses a relatively large number of fiber optic strands 44, which extend from the bottom ends of the casings 40 to the top, as diagrammatically illustrated in FIG. 6.

Figure 6:
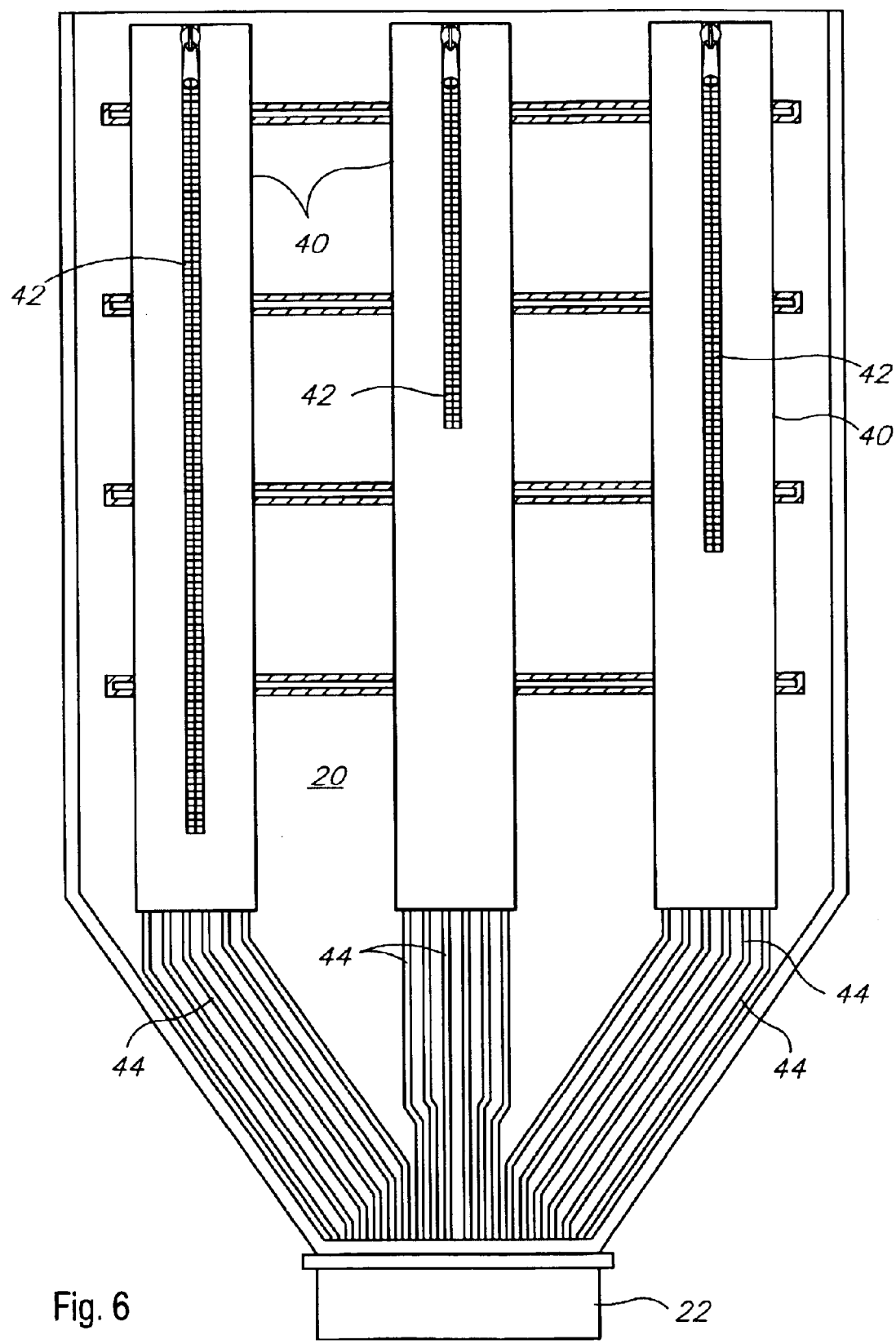
FIG. 6 is a side view of the embodiment of FIG. 1 in an open configuration (refer to FIG. 1 as closed)

As shown in FIG. 6, the three casings 40 have zippered openings 42, which extend three different distances from the top ends thereof toward the bottom. The one in the middle has an opening which extends the shortest distance from the top, while the one on the left is the greatest distance and the one on the right of FIG. 6 extends an intermediate distance from the top toward the bottom.

Figure 7:
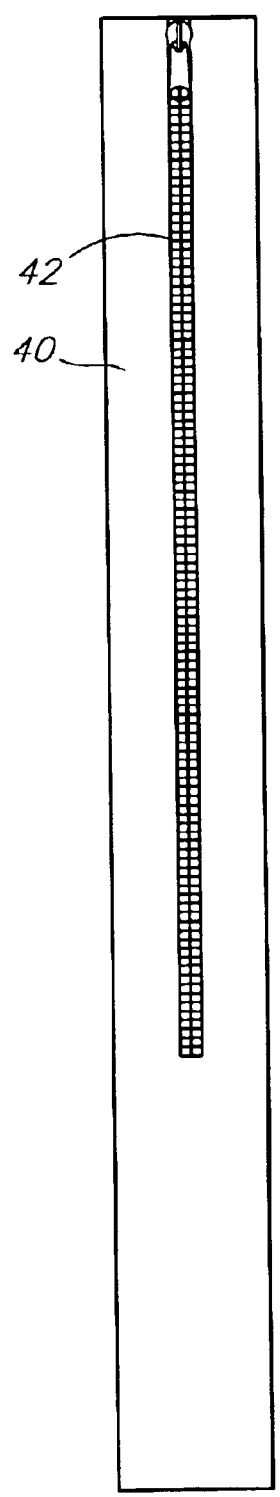
FIG. 7 is a front view of a portion of the embodiment shown in FIG. 6.
Figure 8:
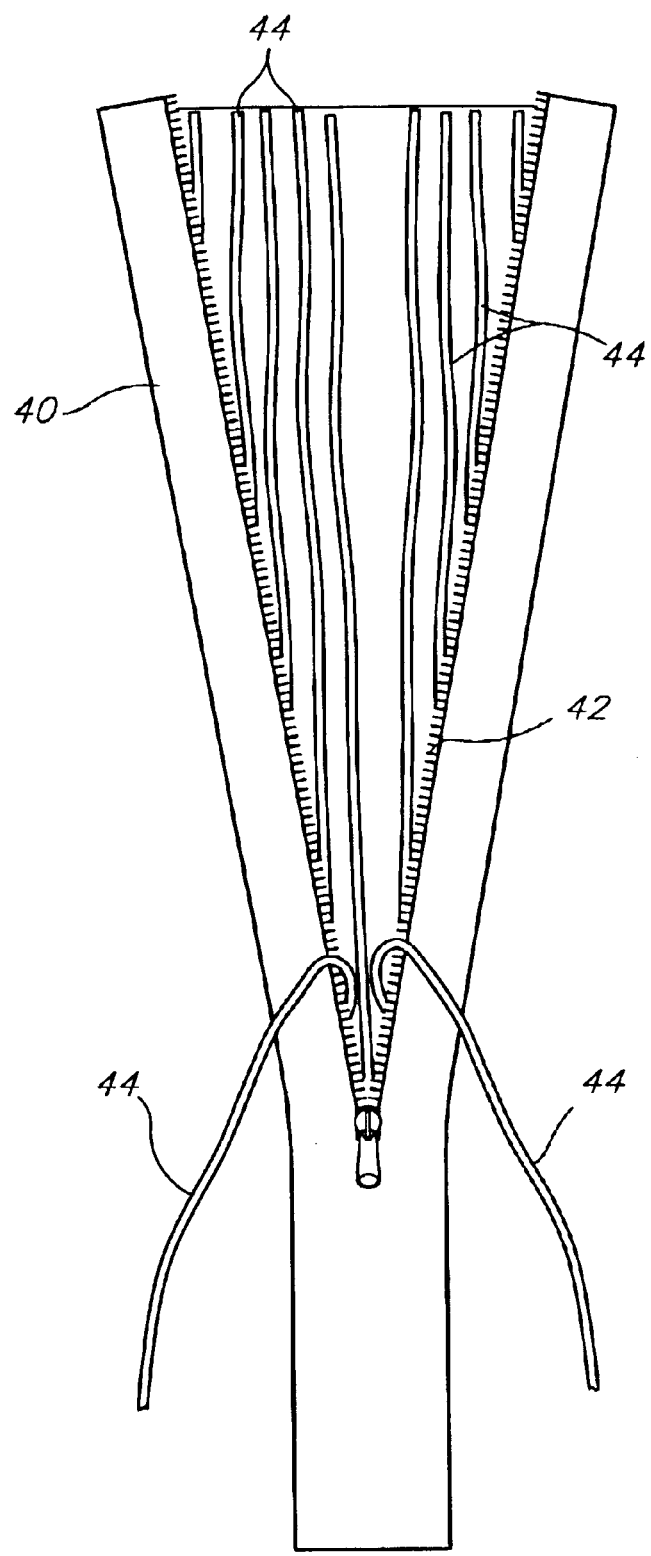
FIG. 8 is an alternative view of the portion shown in FIG. 7 illustrating a feature of its operation.

When the entire assembly is mounted in the tree, as described previously in conjunction with FIGS. 1 through 5, the zippers or reclosable openings 42 in the various casings 40 are opened up by pulling them open from the top to the bottom, as illustrated in FIGS. 7 and 8. This exposes the individual optic fibers within each of the casings 40. It should be noted that the optic fibers in all of the casings 40 extend from the bottom, where they are illuminated by the light source 22 as diagrammatically illustrated in FIG. 6, substantially all the way to the top of each of the casings 40.

When the zippered openings 42 are opened as shown in FIG. 8 to the extent of the full length opening of the zippers, or a lesser amount, the optic fibers 44 in the casings 40 then are exposed, as illustrated in FIG. 8 and in the lower right-hand portion of FIG. 5. The portions of the fibers 44 which extend above the bottom of the reclosable opening 42 then are bent outwardly through the opening and placed on the branches of the tree adjacent the casing 40 in which they were contained. This is diagrammatically illustrated in the lower right-hand portion of FIG. 5, and by the bottom two fibers 44 which are shown in FIG. 8. The fibers may be individually placed along one branch or several branches adjacent each of the casings 40 to provide illumination on those branches.

In the utilization of the system which is shown, the shortest opening, the one shown in the middle casing 40 of FIG. 6, is used to splay out or locate optic fibers 44 on the branches nearest the top of the tree, since the exposed portion of the optic fibers is of a less length than, for example, the exposed portion of the optic fibers 44 which would be displayed or splayed out from the left-hand casing 40 of FIG. 6.

It is readily apparent that by opening the different casings 40 to different lengths, the amount of fiber 44 which extends outwardly from the opening is greater as the opening extends closer toward the base of the tree, as illustrated in the left-hand side of FIG. 6. Thus, the longest fibers 44 (that is the portion which is exposed) are extended out on the lower branches of a tree, since these branches extend outwardly from the trunk 36 a greater distance than branches located near the top. Although only three different lengths are illustrated in FIG. 6, obviously other lengths could be provided, depending upon the utilization which is to be made of the system.

It also is apparent from an examination of FIG. 5, for example, that a single outer cover 20 containing three or four inner casings 40 of optic fibers, generally is not be capable of extending casings 40 around the full 360° circumference of the trunk because of the presence of branches 38. Consequently, two or more systems including outer-covers 20, as illustrated in FIGS. 1 through 5, may be placed at spaced intervals about the trunk 36 of the tree to provide the desired coverage of the optic fibers 44 when the system is opened and utilized in the tree.

Because every portion of the system is comprised of flexible materials, including the fiber optic strands 44, the outer cover 20 and the inner casings 40 all may be arranged in a generally serpentine pattern dictated by the location of the branches 38 extending from the trunk 36 of the tree. The straight orientations which are illustrated in drawings usually do not occur. The operating principle, however, is identical to that which has been described thus far in conjunction with FIGS. 1 through 8 of the drawings.

Figure 9:
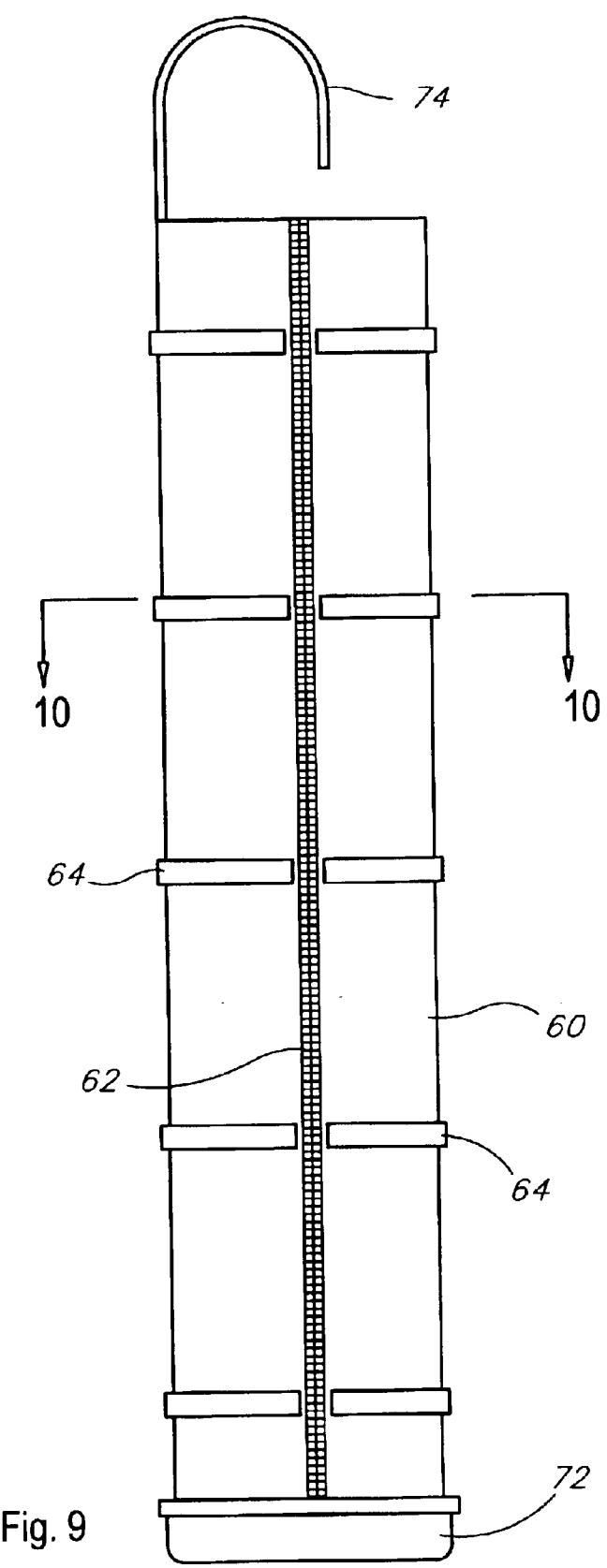
FIG. 9 is a front view of an alternative embodiment of the invention.
Figure 10:
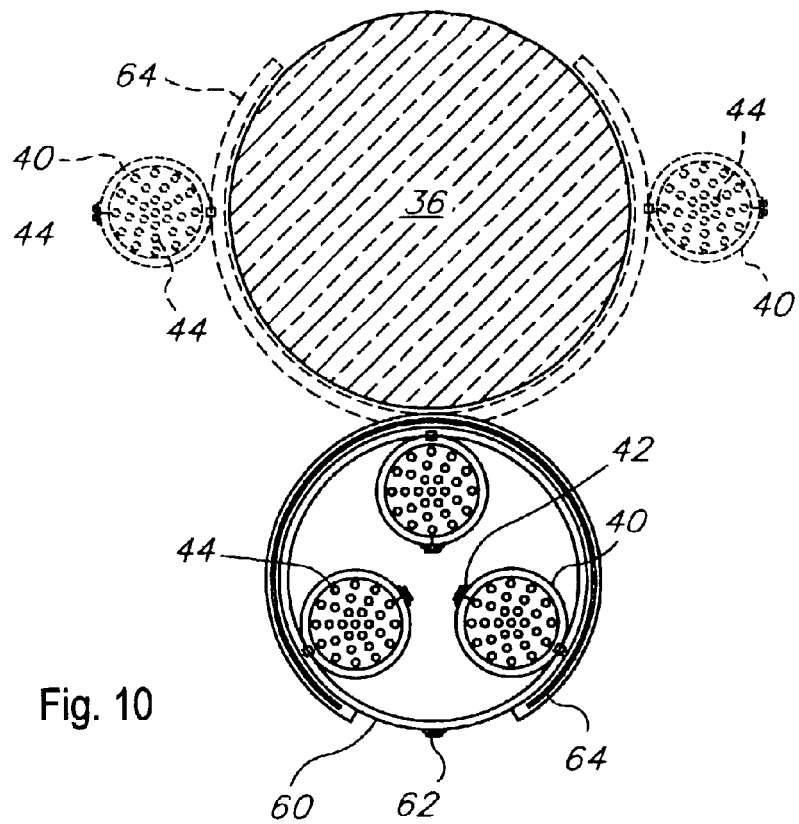
FIG. 10 is a cross-sectional view taken along the line 10—10 of FIG. 9.

FIGS. 9 and 10 illustrate a variation of the embodiment of the invention which is designed to be hung from a branch near the top of the tree, and therefore does not require the straps 26 and loops 28 which are employed with the embodiment of FIGS. 1 through 5. The embodiment of FIG. 9 includes a flexible outer cover 60, which is substantially identical to the outer cover 20 of the embodiment of FIGS. 1 through 5. The outer cover 60 is releasably closed from top to bottom with a zipper 62, or other suitable releasable fastener such as a hook-and-loop fabric fastener, and which operates in the same manner as the zipper closure 24 shown in FIGS. 1 through 5.

At the top of the outer cover 60 of the embodiment of FIG. 9, however, is a rigid hook 74 which is secured to the outer cover or sleeve 60 in any suitable manner. When the device is to be used in a tree, the hook 74 is looped over one or more of the top branches and the entire outer cover 60 is allowed to unfurl or extend downwardly along the trunk 36 of the tree in a serpentine path between the branches 38 to assume a general alignment with the trunk 36 of the tree, as illustrated in FIG. 3 with the embodiment of FIGS. 1 and 2. At the bottom of the assembly of FIG. 9 is a suitable light source 72, which is substantially identical to the light source 22 illustrated in the embodiment of FIGS. 1 through 6.

When the embodiment shown in FIG. 9 is released or opened from top to bottom, in the same manner as described previously for the embodiment of FIGS. 1 through 6, bendable metal fingers 64 (secured to the outer cover 60 in any suitable manner) are then bent backwardly around the trunk 36 of the tree, as shown in dotted lines in FIG. 10, to hold the outer cover 60 open against the trunk 36 of the tree. The outer cover 60 holds three or more casings 40 of optic fiber strands 44, identical in all respects to the casings 40 which have been described previously in conjunction with FIGS. 4 through 8. Thus, when the outer cover 60 is opened from the closed position shown in solid lines in FIG. 10 to the position shown in dotted lines, the inner casings 40 are arranged around the trunk 36 of the tree in much the same manner as illustrated in FIG. 5 in conjunction with the embodiments of FIGS. 1 through 4. The basic operation of the embodiment of FIGS. 9 and 10 is identical to that of the embodiment described previously in conjunction with FIGS. 1 through 6. The inner casings 40 are configured in the same manner as those described in conjunction with FIGS. 6, 7 and 8.

Figure 11:
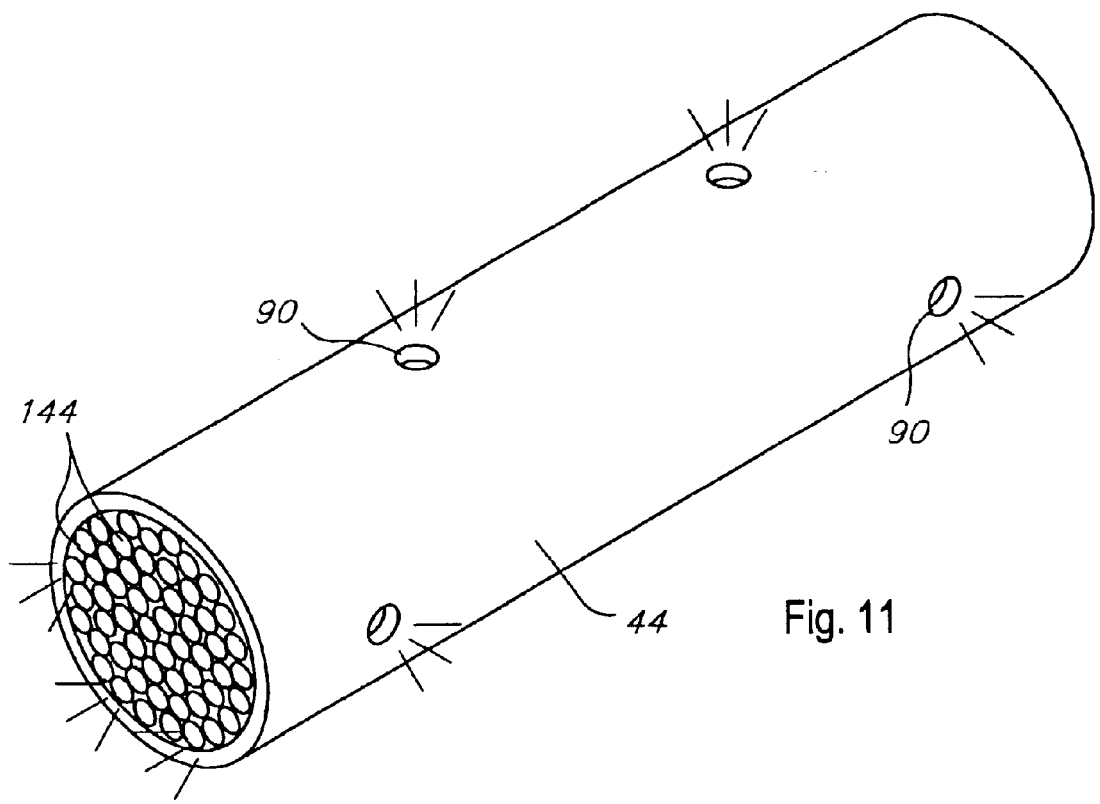
FIG. 11 is a detail of a feature of a preferred embodiment of the invention.

The actual optic fibers 44 which are employed in all of the embodiments which have been described above, and which are shown in the drawings, may be of standard, single strand or multiple twisted strands of flexible optic fibers providing illumination from the exposed end thereof in a manner which is common to several of the prior art optic fiber illumination systems which have been described above. In addition, however, optic fibers may be enclosed in an opaque sheath 44, as illustrated in FIG. 11. The sheath 44 has apertures or openings 90 formed through it to allow light to escape from the sides of fibers 144 which may be a single strand of fiber optic material, or which may be a twisted or woven strand of multiple small fibers to make a larger diameter fiber.

By overdriving the fibers 144 within the sheath 44, light is caused to emanate from the sides of the optic fibers through the holes 90 in the sheath as well as to emanate from the ends, as indicated in FIG. 11. It should be noted that the representation shown in FIG. 11 is much larger than the actual size of the sheath 44, and that the number of fiber strands carried within the sheath may be a single strand (as mentioned earlier) or multiple strands of thin fibers, as indicated in FIG. 11. The invention, however, does not require utilization of an apertured sheath 44 of the type shown in FIG. 11. Conventional end fired fiber optic strands may be employed as well. When end fired strands are used, however, the only light which is present in the tree is projected from the ends of the fibers; whereas if a fiber strand of the type shown in FIG. 11 is employed, tiny pinpoints of light extend from near the trunk of the tree all the way out to the fiber ends when the device is fully illuminated and in use.

When the system is to be stored away, a reverse of the process which has been described previously takes place. The fibers 44 on any given branch are pulled back into the casings 40 which then are zipped closed to place them in the closed position shown in FIGS. 6 and 7. Once this has been done, the fasteners which hold the outer covering 20 or 60 onto the trunk of the tree are loosened or removed; and the outer coverings 20 or 60 is reclosed from the bottom up to place all of the internal fiber optic casings 40 into the configuration generally shown in the top cross-sectional views of FIGS. 4 and 10. Once this has been done, the entire system readily can be removed from the tree, rolled up and stored in a relatively compact package until it is next desired for use.

The foregoing description of the preferred embodiment of the invention is to be considered as illustrative and not as limiting. Various changes and modifications will occur to those skilled in the art for performing substantially the same function, in substantially the same way, to achieve substantially the same results without departing from the true scope of the invention as defined in the appended claims.

What is claimed is:

1. A removable lighting system for a tree including in combination:
    a first elongated generally flexible casing with first and second ends, and having a longitudinal reclosable opening therein extending from the second end toward the first end at least part of the length of the casing; and
    a first plurality of flexible optical fibers in the casing and extending from the first end toward the second end, the optical fibers being released for arrangement on the branches of a tree upon opening of the reclosable opening in the casing.

2. A removable lighting system according to claim 1 further including means for releasably attaching the first elongated casing along the trunk of a tree.

3. The lighting system according to claim 2 wherein the means for releasably attaching the first casing to the tree includes a hanger for suspending the casing from an upper branch of the tree.

4. The lighting system according to claim 2 wherein the means for releasably attaching the first casing to a tree includes releasable fasteners located at spaced intervals along the length of the casing for securing the casing to the trunk or branches of a tree.

5. A lighting system according to claim 2 further including a zipper for closing and opening the longitudinal reclosable opening in the casing.

6. The lighting system according to claim 1 further including at least a second elongated generally flexible casing with first and second ends and having a longitudinal reclosable opening therein extending from the second end toward the first end at least part of the length of the casing; and a second plurality of flexible optical fibers in the second casing and extending from the first end toward the second end, the second plurality of fibers being released for arrangement on the branches of a tree upon opening of the reclosable opening in the second casing, whereupon the length of the longitudinal reclosable opening in the first casing is of a first predetermined length and the length of the longitudinal reclosable opening in the second casing is of a second predetermined length.

7. A lighting system according to claim 6 wherein the first predetermined length is less than the second predetermined length.

8. A lighting system according to claim 2 further including a zipper for closing and opening the longitudinal reclosable openings in the first and second casings.

9. A lighting system according to claim 7 further including means for illuminating the first ends of the plurality of flexible optical fibers.

10. The lighting system according to claim 9 wherein each of the flexible optical fibers is fabricated to transmit light laterally therefrom at predetermined spaced intervals along the length thereof.

11. A lighting system according to claim 1 further including means for illuminating the first ends of the plurality of flexible optical fibers.

12. The lighting system according to claim 1 wherein each of the flexible optical fibers is fabricated to transmit light laterally therefrom at predetermined spaced intervals along the length thereof.

13. A removable lighting system for a tree including in combination:
    first elongated generally flexible elongated outer cover having a longitudinal reclosable opening therein extending substantially from a first end thereof to a second end thereof;
    means for attaching the outer covering in a tree substantially parallel to the trunk of the tree;
    at least one elongated generally flexible inner casing having first and second ends and attached to the interior of the outer covering and exposed by opening of the longitudinal reclosable opening in the outer covering;
    a reclosable opening extending longitudinally from the second end of the inner casing to a predetermined length toward the first end of the inner casing; and
    a plurality of flexible optical fibers in the inner casing extending from the first end toward the second end, the fibers being released for arrangement on the branches of the tree upon opening of the reclosable opening in the inner casing.

14. A lighting system according to claim 13 further including means for illuminating the first ends of the plurality of flexible optical fibers.

15. The lighting system according to claim 13 wherein each of the flexible optical fibers is fabricated to transmit light laterally therefrom at predetermined spaced intervals along the length thereof.

16. The lighting system according to claim 13 wherein a plurality of flexible inner casings are enclosed in and attached to the interior of the outer covering, with each of the plurality of inner casings including a plurality of optical fibers extending from the first end thereof toward the second end thereof, whereupon the longitudinal reclosable opening in each of the plurality of inner casings is of different predetermined lengths.

17. A removable lighting system according to claim 16 further including at least three elongated generally flexible inner casings each enclosing a plurality of flexible optical fibers therein.

18. The lighting system according to claim 17 wherein each of the at least three inner casings has a longitudinal reclosable opening therein extending from the first end thereof to a different predetermined distance toward the second end thereof in each of the three inner casings.

19. The lighting system according to claim 13 wherein the means for releasably attaching the outer cover to the tree includes a hanger attached to the second end of the outer cover.

20. The lighting system according to claim 13 wherein the means for securing the outer cover to the tree includes a plurality of fasteners for attaching the outer cover to the tree at spaced intervals along the length of the outer cover.

* * * * *